United States Patent [19]

Gruffaz et al.

[11] 3,966,678

[45] June 29, 1976

[54] MALEIC ANHYDRIDE-POLYALDIMINE PREPOLYMERS

[75] Inventors: Max Gruffaz, La Mulatiere; Bernard Rollet, Lyon, both of France

[73] Assignee: Rhone-Poulenc S.A., Paris, France

[22] Filed: Sept. 30, 1974

[21] Appl. No.: 510,727

Related U.S. Application Data

[62] Division of Ser. No. 463,249, April 23, 1974, Pat. No. 3,875,087.

[30] Foreign Application Priority Data

Apr. 26, 1973   France .............................. 73.15175

[52] U.S. Cl. ......................... 260/47 UA; 260/2.5 F; 260/2.5 N; 260/47 C; 260/47 CZ; 260/47 CP; 260/78 UA

[51] Int. Cl.² .................. C08F 20/08; C08G 69/44; C08J 9/10

[58] Field of Search ......... 260/2.5 F, 2.5 N, 78 UA, 260/47 CZ, 47 UA, 346.6

[56] References Cited

UNITED STATES PATENTS 3,875,113   4/1975   Lefebvre et al..................... 260/836

OTHER PUBLICATIONS

Wagner–Jauregg, T., Ber., vol. 63, (1930) pp. 3213, and 3218–3224.

Flett, W. H., Maleic Anhydride Derivatives (1953) pp. 137 and 153.

Stillie, J. K., et al. J.O.P.S., "A Novel Diels–Alder Polymerization" part A, vol. II, pp. 1487–1491 (1964).

*Primary Examiner*—Murray Tillman
*Assistant Examiner*—Thurman K. Page
*Attorney, Agent, or Firm*—Stevens, Davis, Miller & Mosher

[57] ABSTRACT

Multicellular polymers having excellent chemical inertness and heat resistance are produced by heating at a temperature from 100° to 300°C, maleic anhydride and a polyaldimine of the general formula

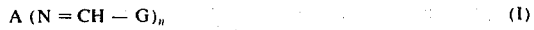

$$A(N=CH-G)_n \qquad (I)$$

in which G represents a monovalent organic radical which contains less than 35 carbon atoms and at least one aromatic or heterocyclic ring in the α-position to the imine group in formula (I), A represents an organic radical of valency $n$ which contains less than 50 carbon atoms and at least one aromatic or heterocyclic ring in the α-position to the imine group in formula (I), and $n$ represents a number at least equal to 2.

1 Claim, No Drawings

MALEIC ANHYDRIDE-POLYALDIMINE PREPOLYMERS

This is a division of application No. 463,249, filed Apr. 23, 1974, now U.S. Pat. No. 3,875,087.

The present invention relates to multicellular polymers.

The use of multicellular synthetic materials in industry has progressed quite considerably in recent years, largely because of their very low density. This density advantage is greatly valued in applications such as heat insulation and in the manufacture of lightweight constructional elements, particularly in the aeronautical industry.

As far as heat insulation is concerned, there is a constantly increasing need for cellular materials which are capable of withstanding severe heat stresses and, in this field, it has already been proposed to make profitable use of the properties of polyimide-type polymers formed from tetracarboxylic acids, or their derivatives, and diamines.

The present invention provides a process for preparing rigid multicellular polymers which comprises heating, at a temperature from 100° to 300°C, a mixture comprising maleic anhydride and a poly-aldimine of the general formula:

$$A(-N=CH-G)_n \qquad (I)$$

in which G represents a monovalent organic radical containing less than 35 carbon atoms and at least one aromatic or heterocyclic ring in the α-position to the carbon atom of the imine group in formula (I), A represents an organic radical of valency $n$ containing less than 50 carbon atoms and at least one aromatic or heterocyclic ring situated in the α-position to the nitrogen atom of the imine group in formula (I) and $n$ represents a number at least equal to 2.

In formula (I) each of the symbols G, which can be identical or different, may, in particular, represent an aryl radical such as phenyl or naphthyl, or a heterocyclic radical with at least one ring, containing at least one O, N or S atom, such as pyridyl, pyrimidinyl, furyl, thienyl, benzo[b]thienyl, indolyl, triazolyl and 3,4-methylenedioxy-phenyl radicals, especially a phenyl, α-hydroxyphenyl or 4-furfuryl radical. The symbol G can also represent a radical containing several identical or different carbocyclic or heterocyclic rings connected to one another either directly or via an inert atom or group such as —O—, —S—, —NH— —COO—, —CONH—, —SO₂—, —N=N—, —N=λ N(O)—, —CO— or a linear or branched alkylene or alkenylene group with up to 8 carbon atoms. Moreover, each of these rings can be substituted by one or more atoms or groups such as —F, —Cl, —Br, —OH, —NO₂ or an alkyl, cycloalkyl, alkenyl or alkoxy radical containing up to 8 carbon atoms or a phenyl radical.

The symbol A can, for example, represent a phenylene radical, one of the radicals of the formulae

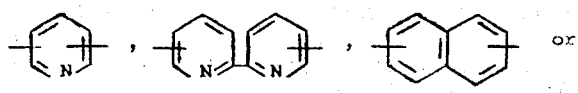

or a divalent radical containing 12 to 30 carbon atoms, consisting of phenylene radicals bonded to one another by a simple valency bond or by an inert atom or group such as —O—, —S—, —SO₂—, —NR₁—, —N=N—, —CONH—, —COO—, —P(O)R₁—, —CONH—X—NHCO—, —N=N(→O)—, an alkylene group with 1 to 3 carbon atoms,

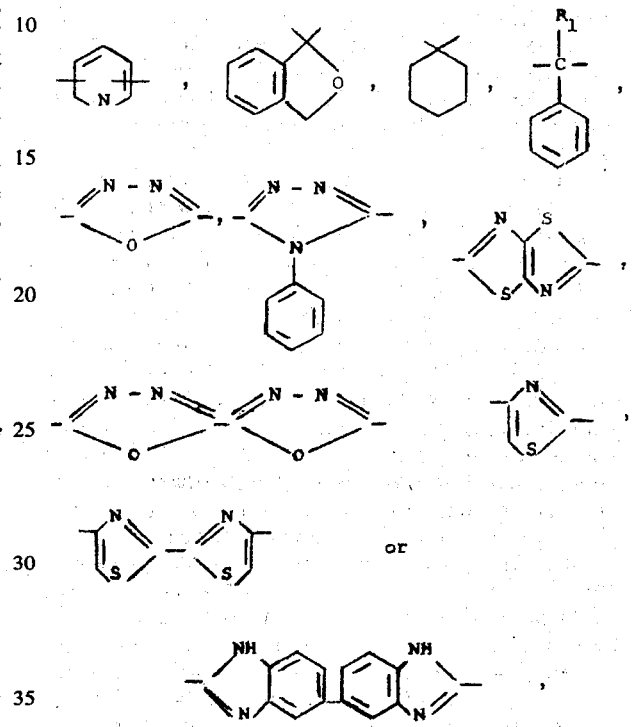

wherein R₁ represents a hydrogen atom, an alkyl radical with 1 to 4 carbon atoms, a phenyl radical or a cyclohexyl radical, and X represents an alkylene radical with less than 13 carbon atoms.

Moreover, the various phenylene radicals can be substituted by methyl groups. A may represent, in particular, a 2,6-pyridyl or a diphenylenemethane radical.

The symbol A can also represent a 3 to 5 valent organic radical which contains less than 50 carbon atoms and which can consist of a naphthalene, pyridine or triazine nucleus, a benzene nucleus optionally substituted by 1 to 3 methyl groups, or several benzene nuclei bonded to one another by an inert atom or group such as those mentioned above, or

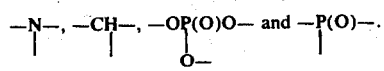

The polyimines of formula (I) can be considered as being derived from the condensation of one mol of a primary polyamine of the formula

with $n$ mols of an aldehyde of the formula

in which formulae the symbols A, G and $n$ are as defined above.

Suitable polyamines of formula (II) which can be used for the preparation of the polyaldimines of formula (I), include 2,6-diaminopyridine, meta-phenylenediamine, para-phenylenediamine, bis-(4-aminophenyl)-methane, 2,2-bis-(4-aminophenyl)-propane, benzidene, bis-(4-aminophenyl) ether, 4,4'-diaminophenyl sulphide, bis-(aminophenyl)sulphone, bis-(4-aminophenyl)methylphosphine oxide, bis(4-aminophenyl)-phenylphosphine oxide, 1,5-diaminonaphthalene, meta-xylylene-diamine, para-xylylene-diamine, 1,1-bis-(para-aminophenyl)-phthalane, 6,6'-diamino-2,2'-dipyridyl, 4,4'-diamino-benzophenone, 4,4'-diamino-azobenzene, bis-(4-aminophenyl)-phenylmethane, 1,1-bis-(4-aminophenyl)-cyclohexane, 1,1-bis-(4-amino-3-methylphenyl)-cyclohexane, 2,5-bis-(m-aminophenyl)-1,3,4-oxadiazole, 2,5-bis-(p-aminophenyl)-1,3,4-oxadiazole, 2,5-bis-(m-aminophenyl)-thiazolo(4,5-d)thiazole, 5,5'-di-(m-aminophenyl)-2,2'-bis-(1,3,4-oxadiazolyl), 4,4'-bis-(p-aminophenyl)-2,2'-dithiazole, m-bis-[2-(4-p-aminophenyl)thiazolyl]-benzene, 2,2'-bis-(m-aminophenyl)-5,5'-dibenzimidazole, 4,4'-diaminobenzanilide, phenyl 4,4'-diamino-benzoate, N,N'-bis-(4-aminobenzoyl)-p-phenylenediamine, 3,5-bis-(m-aminophenyl)-4-phenyl-1,2,4-triazole, N,N'-bis(p-aminobenzoyl)-4,4'-diaminodiphenylmethane, bis-p-(4-aminophenoxycarbonyl)-benzene, bis-p-(4-aminophenoxy)-benzene, 3,5-diamino-1,2,4-triazole, 1,1-bis-(4-aminophenyl)-1-phenyl-ethane, 3,5-bis-(4-aminophenyl)-pyridine, 1,2,4-triamino-benzene, 1,3,5triamino-benzene, 2,4,6-triamino-toluene, 2,4,6-triamino-1,3,5-trimethylbenzene, 1,3,7-triamino-naphthalene, 2,4,4'-triamino-diphenyl, 2,4,6-triamino-pyridine, 2,4,4'-triamino-phenyl ether, 2,4,4'-triamino-diphenylmethane, 2,4,4'-triamino-dipheyl-sulphone, 2,4,4'-triamino-3-methyl-diphenylmethane, 2,4,4'-triaminobenzophenone, N,N,N-tri-(4-aminophenyl)-amine, tri-(4-aminophenyl)-methane, 4,4',4''-triamino-phenyl orthophosphate, tris-(4-aminophenyl)-phosphine oxide, 3,5,4'-triamino-benzanilide, melamine, 3,5,3',5' -tetraaminobenzophenone, 1,2,4,5-tetraamino-benzene, 2,3,6,7-tetraamino-naphthalene, 3,3'-diamino-benzidine, 3,3',4,4'-tetraamino-phenyl ether, 3,3',4,4'-tetraamino-diphenylmethane, 3,3'4,4'-tetramino-diphenylsulphone, 3,5-bis-(3,4-diaminophenyl)-pyridine, and oligomers of the average formula

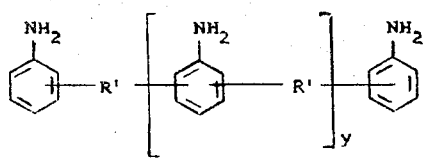

in which y represents a number ranging approximately from 0.1 to 2 and R' represents a divalent hydrocarbon radical of 1 to 8 carbon atoms which is derived from an aldehyde or a ketone of the general formula:

O = R' in which the oxygen atom is bonded to a carbon atom of the radical R'; typical aldehydes and ketones include formaldehyde, acetaldehyde, benzaldehyde, oenenthal, acetone, methyl ethyl ketone, 2-hexanone, cyclohexanone and acetophenone. These oligomers can be produced in accordance with known processes such as those which are described in French Patents Nos. 1,430,977, 1,481,935 and 1,533,696.

Aldehydes of formula (III) include benzaldehyde, o- and p-chlorobenzaldehydes, o- and p-fluorobenzaldehydes, o-, m- and p-tolualdehydes, p-ethylbenzaldehyde, 2,4-dimethylbenzaldehyde, p-(tertiary butyl)-benzaldehyde, cumaldehyde, salicylaldehyde, p-hydroxybenzaldehyde, protocatechaldehyde, β-resorcylaldehyde, o-vanillin, vanillin, veratraldehyde, o- and p-nitrobenzaldehydes, o- and p-anisaldehyde, 3-ethoxy-4-hydroxy-benzaldehyde, 2,4,5-trimethoxybenzaldehyde, 2-furaldehyde, piperonal, pyridine-2-carbaldehyde and pyridine-4-carbaldehyde, 3-methyl-2-furaldehyde, 3,4-, 3,5- and 4,5-dimethyl-2-furaldehyde, 5-benzyl-2-furaldehyde, 4,6-dimethylpyrimidine-2-carbaldehyde, indole-3-carbaldehyde, 2-methylindole-3-carbaldehyde, α-thiophenaldehyde, benzo[b]-thiophene-2-carbaldehyde, benzo[b]thiophene-3-carbaldehyde, 4-formyl-1,2,3-triazole, 2-phenyl-1,2,3-triazole-4-carbaldehyde, 1-methyl-1,2,3-triazole-4-carbaldehyde, 1-phenyl-1,2,3-triazole-4-carbaldehyde, 1-phenyl-5-methyl-1,2,3-triazole-4-carbaldehyde, 1,5-diphenyl-1,2,3-triazole-4-carbaldehyde, o- and p-phenylbenzaldehydes, (p-nitrophenyl)-benzaldehyde, p-(p-tolyl)-benzaldehyde, o- and p-benzylbenzaldehydes, o- and p-phenoxybenzaldehydes, p-thiophenoxybenzaldehyde, p-cyclohexylbenzaldehyde, p-cyclopentylbenzaldehyde, α-naphthaldehyde, β-naphthaldehyde, 1-methyl-4-naphthaldehyde, 1,6-dimethyl-4-naphthaldehyde, 1-hydroxy-4-naphthaldehyde, 1-hydroxy-2-naphthaldehyde, 2,3-dihydroxy-1-naphthaldehyde, 4-formyl-diphenyl-sulphone, 4-formyl-azobenzene, 4-formyl-azoxybenzene and 4-formyl-benzophenone.

The polyimines of formula (I) can be prepared from such polyamines and aldehydes by applying the method described by BUU-HOI et al [Bull. Soc. Chim. Fr. (1956) p. 710].

Bis-aldimines, such as those mentioned below, are preferably used: bis-(4-benzylideneaminophenyl)-methane, 2,2-bis-(4-benzylideneaminophenyl)-propane, bis-(4-benzylideneaminophenyl)-sulphone, bis(4-benzylideneaminophenyl) ether, bis-(4-salicylideneaminophenyl)-methane, bis-(4-salicylideneaminophenyl)-sulphone, bis-(4-o-chlorobenzylideneaminophenyl)-sulphone, bis-(3,4-methylenedioxy-4-benzylideneaminophenyl)-sulphone, bis-(4-p-methoxybenzylideneaminophenyl)-sulphone, bis-(4-thenylideneaminophenyl)-sulphone, bis-(4-furfurylideneaminophenyl)-sulphone, bis-(4-furfurylideneaminophenyl)-methane, 2,6-bis-(furfurylideneamino)-pyridine, bis-(4-naphtylmethylideneaminophenyl)-methane, bis-(4-p-phenylsulphonylbenzylideneaminophenyl)-methane, bis-(4-o-phenylazobenzylideneaminophenyl)-methane, bis-[4-(2-pyridyl)methylideneaminophenyl]-methane, 2,6-bis-(benzylideneamino)-pyridine, 1,4-bis-(benzylideneamino)-benzene, 1,3-bis-(benzylideneaminomethyl)-benzene, 1,3 -bis-(benzylideneamino)-benzene, 3,5-bis-(4-benzylideneaminophenyl)-pyridine, 2,6-bis-(salicylideneamino)-pyridine and 6,6'-bis-(benzylideneamino)-2,2'-dipyridyl.

For the preparation of the multicellular polymers of the present invention, 0.5 to 5 mols, especially 0.7 to 3 mols, of maleic anhydride are generally used per imine group in the polyaldimine.

It is to be understood that it is possible to use either a single polyimine or a mixture of polyimines. Although it is possible to produce cellular products directly by heating maleic anhydride and the polyaldimine under the specified conditions, it is advantageous, for technological reasons, to prepare these cellular polymers in two steps. In a first step, it is possible to prepare a prepolymer (P) which can be isolated, and, optionally, purified and stored. At ambient temperature, this prepolymer is generally in the form of a solid with a noncellular structure, which can be reduced to powder form, or is in the form of a viscous liquid. During subsequent heating, the prepolymer (P) can be converted into a multicellular polymer, if desired after if has been shaped.

The prepolymers (P) can be prepared in bulk simply by heating a mixture of the reagents. The initiation temperature for reacton can vary within rather wide limits depending on the nature of the reagents but, as a general rule, it is from 100° to 220°C and, most frequently, from 150° to 200°C. The reaction is exothermic and is accompanied by the evolution of carbon dioxide, the aldehyde corresponding to the aldimine used being formed. It is advisable to control the way in which the reaction takes place by removing at least a part of the heat produced. It is possible, for example, to keep the reaction temperature in the vicinity of the initiation temperature; when it is greater than the latter, it is preferable that the difference should not exceed approximately 50°C. Depending on the temperature and on the nature and proportions of the reagents present, and depending on the extent to which it is desired that the reaction should take place, the period of heating is generally from 5 minutes to 3 hours.

The prepolymers (P) can also be prepared by heating the reagents in a diluent which is inert and liquid at the temperature used, generally from 100° to 220°C and preferably from 150° to 200°C. Amongst the diluents which can be used, there may be mentioned polar solvents such as dimethylformamide, N-methylpyrrolidone, dimethylacetamide, N-methyl-caprolactam, diethylformamide, N-acetylpyrrolidone and cresols. It is also possible to use an aldehyde which is liquid in at least a part of the range 100° to 220°C, such as benzaldehyde, salicylaldehyde, o- and p-anisaldehydes, 2-hydroxy-3-methoxy-benzaldehyde, 2-furaldehyde and α-thiophenylaldehyde. According to a particular embodiment, it is possible to use the solutions obtained from a polyamine of formula (II) and an excess of liquid aldehyde of formula (III) directly - after removing the water formed.

Generally from 0.2 to 20 times the weight of polyaldimine introduced of diluent is used.

The prepolymers (P) are advantageously prepared in the presence of a radical-type polymerisation inhibitor, such as hydroquinone or 2,4-dihydroxy-azobenzene but it is also possible to use other inhibitors such as those mentioned in "Encyclopedia of Polymer Science and Technology", Vol. 7, p. 644 to 662.

The conversion of the prepolymer (P) to the multicellular polymer can be effected by heating at a temperature of from 200° to 300°C, more generally from 220° to 280°C, generally for 10 minutes to 5 hours. When the prepolymer is solid, it is advantageous to reduce it to a powder before it is heated. It is also possible to extract from it, at least partially, the aldehyde liberated by the reaction, for example by washing with a solvent which does not dissolve, or practically does not dissolve, the prepolymer. Such solvents include alcohols, ethers, ketones and aromatic hydrocarbons.

The prepolymer can be combined with liquid or solid adjuvants in the form of, for example a powder, spheres, platelets, granules, fibres or flakes, for the purpose of improving or modifying one or more characteristics of the finished article.

It is thus possible to incorporate into the prepolymer adjuvants which make it possible to increase the homogeneity of the cellular structure of the polymers, such as surface-active agents or pulverulent fillers which are inert with respect to the reagents employed. Suitable surface-active agents include organopolysiloxanes comprising organic blocks of the polyoxyalkylene type. Such copolymers are described in, for example, "PLASTIC FOAMS", C. J. BENNING, Vol. 2, pages 320–325. The proportion of surface-active agent generally represents 0.1 to 2% by weight of the prepolymer (P). Suitable pulverulent fillers, which usually represent 5 to 50% of the weight of the prepolymer, include pyrogenic silicas, crude ground silicas, quartz, alumina, titanium oxide, talc, kaolin, mica, calcium carbonate, graphite and carbon black.

It is also possible to use adjuvants which enable the density of the cellular polymers to be reduced. Examples of such adjuvants include pore-forming agents such as azodicarbonamide and the products mentioned in volume 2, pages 294 to 320 of BENNING loc. cit. The proportion of pore-forming agent can be as much as 10% of the weight of the prepolymer (P).

Adjuvants which make it possible to increase the hardness, the mechanical properties or the heat stability of the multicellular polymers can also be mixed with the prepolymer. A particular example of such an adjuvant is boric anhydride which, generally used in an amount from 1 to 30% of the weight of the prepolymer, increases the heat-resistance and the flameproof character of the polymers.

Before heating the prepolymer to convert it into a cellular polymer, it can be advantageous to effect a preagglomeration of the prepolymer and the adjuvants, optionally in the presence of a liquid such as water, especially when the prepolymer is in powder form and no liquid adjuvant is used.

The multicellular polymers of this invention possess, even for apparent densities as low as 0.1, good mechanical properties, very great inertness to solvents and to chemical agents and excellent resistance to heat stresses and to fire.

Because of these properties, the cellular polymers of this invention are of value in many fields of industry. By way of example, they can be used for the manufacture of insulators in the form of plates or tubes, for example for the building industry and for the aeronautical and space industries.

The following Examples further illustrate the present invention. In these Examples, the compressive strength is measured in accordance with ASTM Standard Specification D 1621 - 59 T.

EXAMPLE 1 a. A vessel containing a mixture of 150 g of bis-(4-benzylideneaminophenyl)-methane, 78.4 g of maleic anhydride and 2 g of 2,4-dihydroxy-azobenzene is immersed in a bath kept at 175°C. As soon as the temperature of the mixture reaches 160°C, heating is stopped and the mixture is kept at 170°–175°C for 15 minutes.

During the operation, 4.7 g of carbon dioxide are evolved. After cooling to 25°C, the mass is finely ground and is washed twice with benzene. After drying, 173 g of a prepolymer powder ($P_1$) are thus obtained.

b. 50 g of the powder ($P_1$), 2 g of azodicarbonamide, 2 g of water and 0.4 g of a copolymer possessing dimethylpolysiloxane-polyoxyalkylene blocks, the organic blocks of which are terminated by OH groups, prepared in accordance with the technique described in French Patent No. 1,175,305, as surface-active agent, are mixed intimately.

16 g of this mixture are compressed for 5 minutes under a pressure of 50 bars to give a disc of height 8.2 mm and diameter 50 mm. This disc is placed in a heat-insulated ring (internal diameter: 60 mm and height: 45 mm) between two aluminium plates on which there is placed, on the side of the ring, a woven glass fabric with an open mesh so as to permit the escape of air and, where appropriate, volatile products. The whole is placed between the platens of a press preheated to 270°C and is left at this temperature for 30 minutes.

A multicellular polymer is obtained in the form of a cylinder which possesses a skin and an apparent density of 0.11.

The compressive strength of the polymer is 9.5 kg/cm$^2$ for a deformation of 10%.

c. 18 g of the powder ($P_1$), 0.4 g of azodicarbonamide, 0.4 g of the surface-active agent described under (b), 1 g of water and 1 g of maleic anhydride are mixed intimately.

Following the procedure described under (b), a polymer with a cellular structure, of apparent density 0.14, is obtained in the form of a cylinder of diameter 60 mm and height 45 mm. The compressive strength is 7.2 kg/cm$^2$ for 10% deformation.

d. 50 g of the powder ($P_1$), 12 g of boric anhydride, 2.5 g of azodicarbonamide and 2.5 g of water are mixed intimately. A disc is produced by compression, which, when heated under the conditions described under (b), yields a cellular polymer of apparent density 0.16, the compressive strength of which is 11.0 kg/cm$^2$ for a deformation of 10%.

e. 17.5 g of the powder ($P_1$), 2.5 g of boric anhydride and 0.5 g of the surface-active agent described under (b) are mixed intimately. A disc is formed by compression, which, when heated for 45 minutes at 275°C (in accordance with the technique described under (b) yields a cellular polymer of apparent density 0.15. Its compressive strength is 5 kg/cm$^2$ for a deformaton of 10%.

Exposure at 250°C for a long period does not change the appearance of the polymer. The weight losses are as follows:

after 216 hours at 250°C: 7.5% and
after 300 hours at 250°C: 10%.

EXAMPLE 2 a. 198 g of 4,4'-diamino-diphenylmethane are added, over 15 minutes, with stirring, to 1,000 g of benzaldehyde. After stirring for 30 minutes, 400 cm$^3$ of benzene are added. The water-benzene azeotrope is then distilled under a pressure of 145 mm Hg., followed by the residual benzene.

200 g of maleic anhydride and 5 g of 2,4-dihydroxyazobenzene are incorporated into the solution of bis-(4-benzylideneaminophenyl)-methane obtained, and then the reaction mixture is heated at 172°–174°C for 2 hours 30 minutes. During the heating, 17.9 g of carbon dioxide are collected. 730 g of benzaldehyde are then removed by distillation under 20 mm Hg., and the residual solid mass is then treated as stated in Example 1(a). After drying, 398 g of a prepolymer powder ($P_2$) are thus obtained.

b. 50 g of the powder ($P_2$), 10 g of boric anhydride, 3 g of water, 2.5 g of azodicarbonamide and 2 g of the surface-active agent described under 1b are mixed intimately. Following the procedure described under 1b, a cellular polymer of apparent density 0.20 is produced.

EXAMPLE 3 a. The procedure described in Example 1(a) is followed, but starting from 135.5 g of bis-(4-salicylideneaminophenyl)-methane, 66 g of maleic anhydride and 2 g of 2,4-dihydroxyazobenzene. The mixture is kept at 175°C for 12 minutes and 3.9 g of carbon dioxide are collected.

After grinding and washing with benzene, followed by drying, 167.3 g of a prepolymer powder ($P_3$) are collected.

b. 50 g of the powder ($P_3$), 2.5 g of azodicarbonamide, 2.5 g of water and 1 g of the surface-active agent used under 1(b) are mixed intimately.

By compressing a portion of this mixture, a disc is produced which, when heated at 270°–180°C, in accordance with the technique described under 1(b), yields a cellular polymer of apparent density 0.17.

c. A cylindrical piece of diameter 40 mm, manufactured according to (b) is placed 8 cm above the flame of a blow-pipe (900°–1,000°C) for 2 hours. The temperature on the upper face of the cylinder remained at 90° ± 5°C for the entire duration of the operation. It is found, at the end of the experiment, that the upper face of the cylinder is unaffected.

EXAMPLE 4 a. An operation similar to that of Example 1 is carried out, starting from 103 g of bis-(4-salicylideneaminophenyl)-methane, 2 g of 2,4-dihydroxy-azobenzene and 102 g of maleic anhydride. During the test, 4.36 g of carbon dioxide are collected. After grinding and washing in the presence of benzene, followed by drying, 133.3 g of a prepolymer powder ($P_4$) are isolated.

b. 50 g of the powder ($P_4$), 2.5 g of azodicarbonamide, 2.5 g of water and 1 g of the surface-active agent used in Example 1(b) are mixed intimately. A disc of material is produced from 20 g of this mixture, under the conditions described in Example 1(b). On being heated at 270°–280°C for 30 minutes, this disc gives rise to a multicellular polymer with an apparent density of 0.18.

EXAMPLE 5

A mixture consisting of 31.7 g of 2,6-bis-(salicylideneamino)-pyridine, 0.3 g of 2,4-dihydroxyazobenzene and 20 g of maleic anhydride is kept at 180°C for 10 minutes. During the operation, 2.55 g of carbon dioxide are collected. The reaction mixture is treated as indicated in Example 1(b), and 48.6 g of a powder ($P_5$) are collected.

By working this powder under the conditions described in Example 1(b) (same adjuvants, same proportions), a cellular polymer of apparent density 0.15 is prepared.

EXAMPLE 6

8.95 g of an intimate mixture of maleic anhydride (3.45 g) and bis-(4-furfurylideneaminophenyl)-methane (5.5 g), finely ground beforehand, are introduced into an aluminium cylinder (diameter 7 cm and height 6.5 cm). The cylinder is placed in an oven preheated to 200°C for 1 hour. The foam obtained has an apparent density of 0.1.

We claim:

1. A prepolymer obtained by heating maleic anhydride and a polyaldimine of the general formula:

A (N = CH — G)$_n$ in which G represents a phenyl, naphthyl, pyridyl, pyrimidinyl, furyl, thienyl, benzo[b]thienyl, indolyl, triazolyl or 3,4-methylenedioxy-phenyl radical or a several said radicals connected to one another directly or via a —O—, —S—, —NH—, —COO—, —CONH—, —SO$_2$—, —N=N—, —N=N(O)—, —CO— or a linear or branched alkylene or alkenylene group with up to 8 carbon atoms, A represents a phenylene radical, a radical of the formula:

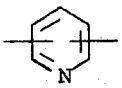 , 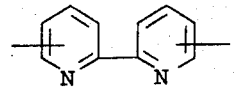 , 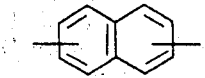 or

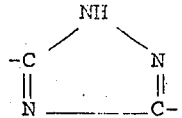

or a divalent radical containing 12 to 30 carbon atoms, consisting of phenylene radicals bonded to one another by a simple valency bond or by —O—, —S—, —SO$_2$—, —NR$_1$—, —N=N—, —CONH—, —COO—, —P-(O)R$_1$—, —CONH—X—NHCO—, —N=N( → O)—, an alkylene group with 1 to 3 carbon atoms,

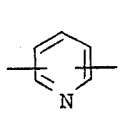 , 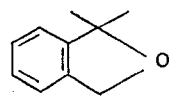 , 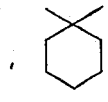 , 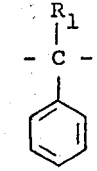 ,

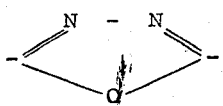 , 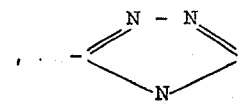 , 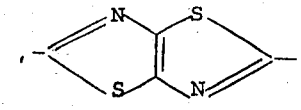 ,

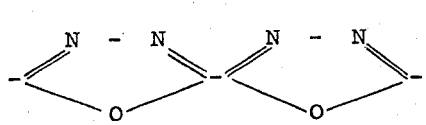 , 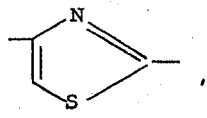 ,

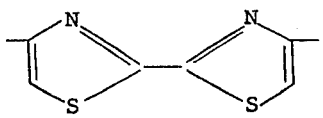 or

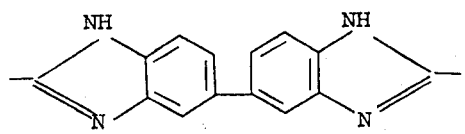

wherein $R_1$ represents a hydrogen atom, an alkyl radical with 1 to 4 carbon atoms, a phenyl radical or a cyclohexyl radical, and X represents an alkylene radical with less then 13 carbon atoms or a 3 to 5 valent naphthalene, pyridine, triazine or benzene radical or a 3 to 5 valent radical consisting of several benzene nuclei bonded to one another by a —O—, —S—, —SO$_2$—, —NR$_1$—, —N=N—, —CONH—, —COO—, —P(O)R$_1$—, —CONH—X—NHCO—, —N=N(→O)—, an alkylene group with 1 to 3 carbon atoms,

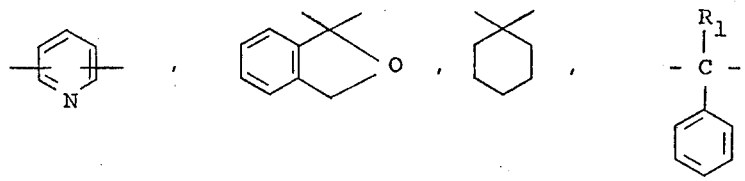

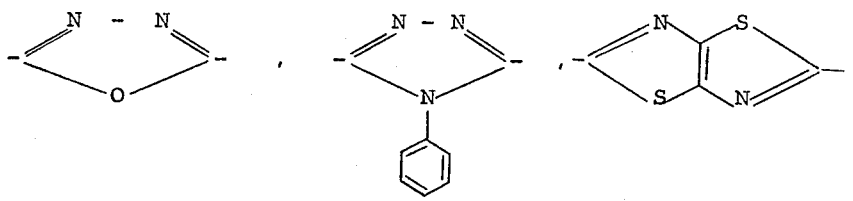

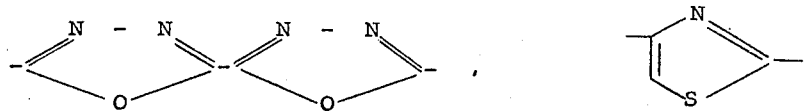

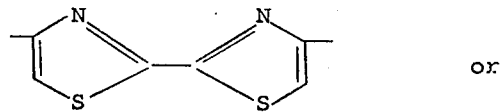

or

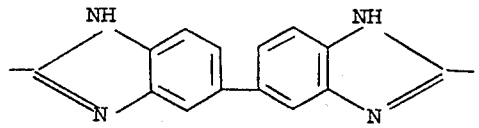

wherein $R_1$ represents a hydrogen atom, an alkyl radical with 1 to 4 carbon atoms, a phenyl radical or a cyclohexyl radical, and X represents an alkylene radical with less than 13 carbon atoms or

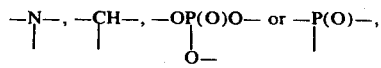

and $n$ represents a number at least equal to 2, at a temperature from 100° to 200°C.

* * * * *